United States Patent [19]
Aoshima

[11] Patent Number: 5,809,503
[45] Date of Patent: Sep. 15, 1998

[54] LOCKING MECHANISM FOR CHECK IN/CHECK OUT MODEL WHICH MAINTAINS DATA CONSISTENCY AMONGST TRANSACTIONS

[75] Inventor: Masaaki Aoshima, Kawasaki, Japan

[73] Assignee: Fujitsu Limited, Kawasaki, Japan

[21] Appl. No.: 702,858

[22] Filed: Aug. 26, 1996

Related U.S. Application Data

[63] Continuation of Ser. No. 253,703, Jun. 3, 1994, abandoned.

[30] Foreign Application Priority Data

Jul. 8, 1993 [JP] Japan ..................................... 5-168999

[51] Int. Cl.$^6$ .................................................. G06F 17/30
[52] U.S. Cl. .............................................. 707/8; 707/201
[58] Field of Search .................... 395/601–617, 395/726; 707/9, 8, 200, 201

[56] References Cited

U.S. PATENT DOCUMENTS

| | | | |
|---|---|---|---|
| 4,224,664 | 9/1980 | Trinchieri ................................ | 395/650 |
| 4,249,241 | 2/1981 | Aberle et al. ............................ | 395/500 |
| 4,881,166 | 11/1989 | Thompson et al. ...................... | 395/600 |
| 5,175,852 | 12/1992 | Johnson et al. .......................... | 395/600 |
| 5,193,188 | 3/1993 | Franaszek et al. ....................... | 395/650 |
| 5,247,672 | 9/1993 | Mohan .................................... | 395/650 |
| 5,261,089 | 11/1993 | Coleman et al. ......................... | 395/600 |
| 5,280,612 | 1/1994 | Lorie et al. .............................. | 395/600 |

FOREIGN PATENT DOCUMENTS

| | | |
|---|---|---|
| 42 16 871 | 1/1993 | Germany . |
| 63-094343 | 4/1988 | Japan . |
| 63-113644 | 5/1988 | Japan . |
| 63-247849 | 10/1988 | Japan . |
| 2-224152 | 9/1990 | Japan . |
| 3-113674 | 5/1991 | Japan . |
| 3-118645 | 5/1991 | Japan . |
| 3-123946 | 5/1991 | Japan . |

OTHER PUBLICATIONS

Microsoft Press Computer Dictionary, 3rd Ed., 1997, p. 381.
Tichy, Walter F., "RCS—A System for Version Control," Software–Practice and Experience, vol. 15(7), Jul. 1985, pp. 637–654.
R.E. Stearns et al., "Concurrency Control for Database Systems", Proceedings of the 17th Annual IEEE Symposium on Foundations of Computer Science, 1976, pp. 19–32.
D.J. Rosenkrantz et al., System Level Concurrency Control for Distributed Data Base Systems, ACM Trans—on Database Systems, 3:2, pp. 178–198.
H.T. Kung et al., "On Optimistic Methods for Concurrency Control," ACM Trans. on Database Systems, vol. 6, No. 2., 1981, pp. 213–226.
Translation—German Patent Office, Office Action dated Sep. 13, 1996, Official File No. P 44 20 451.5–53.
"Deadlock Prediction For Escrow Transactions", *Information Systems*, vol. 16, No. 1, pp. 13–20, 1991.
English Abstract of 63–094343, Apr. 1988, Japan.

(List continued on next page.)

*Primary Examiner*—Paul V. Kulik

[57] ABSTRACT

A locking mechanism for a check-in/check-out model in which one or a plurality of clients make access to a public database of a server, includes a long transaction management part, provided in the server, for managing transactions including a check-out which copies data from the public database and a check-in which writes data back to the public database requested from the client, a short transaction management part, provided in the server, for managing transactions which do not copy data from the public database, and a transaction list storing information indicative of contents of transactions carried out by each of the long transaction management part and the short transaction management part. The long transaction management part waits the check-in of arbitrary data until another transaction making reference to the arbitrary data ends when the other transaction is detected from the transaction list between the check-out and the check-in.

13 Claims, 8 Drawing Sheets

OTHER PUBLICATIONS

English Abstract of 63–113644, May 1988, Japan.
English Abstract of 63–247849, Oct. 1988, Japan.
English Abstract of 2–224152, Sep. 1990, Japan.
English Abstract of 3–113674, May 1991, Japan.
English Abstract of 3–118645, May 1991, Japan.
English Abstract of 3–123946, May 1991, Japan.

INITIAL VALUES X = 100 DOLLARS  Y = 100 DOLLARS

F I G. 6
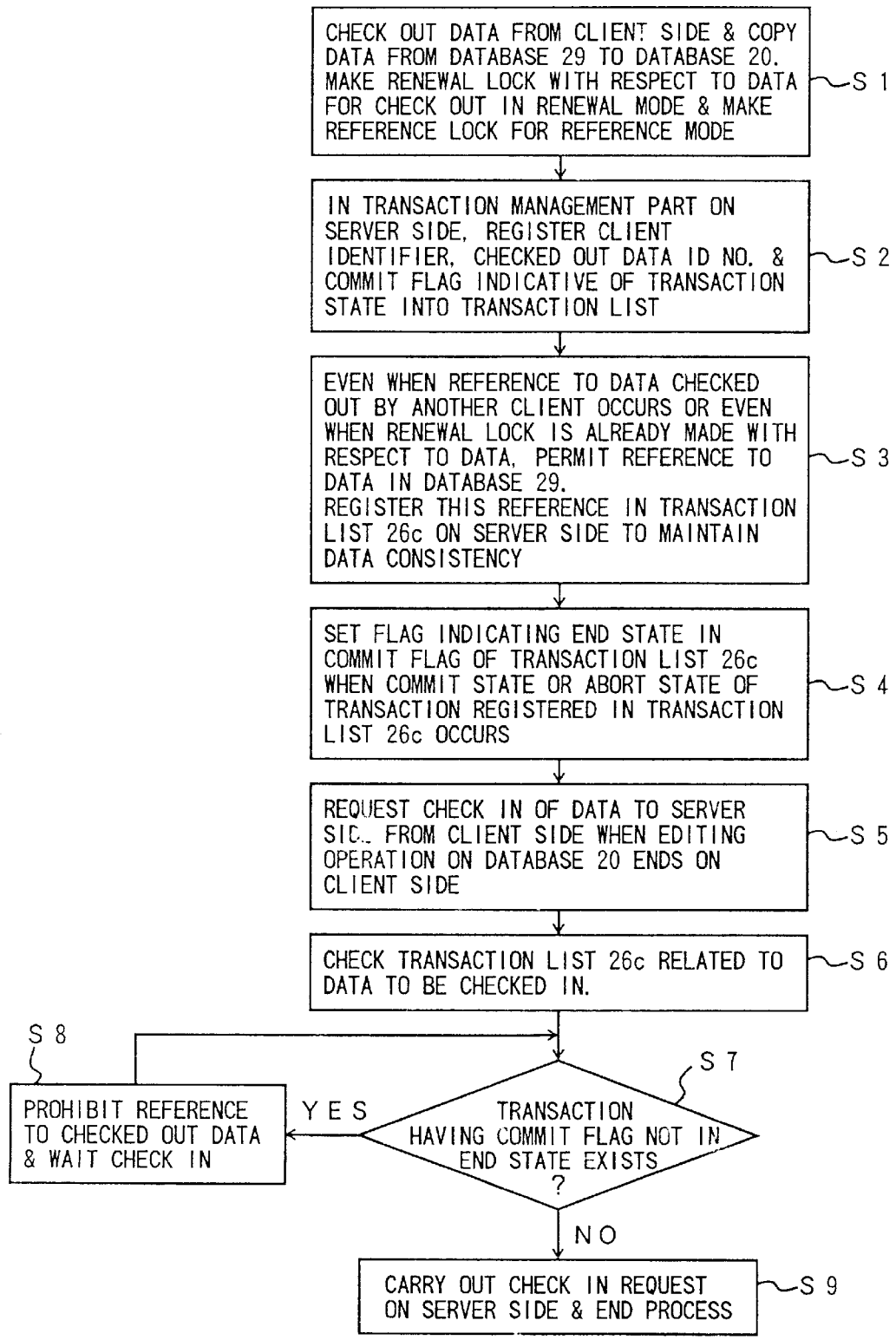

INITIAL VALUES X = 100 DOLLARS  Y = 100 DOLLARS

LOCKING MECHANISM FOR CHECK IN/CHECK OUT MODEL WHICH MAINTAINS DATA CONSISTENCY AMONGST TRANSACTIONS

This application is a continuation of application Ser. No. 08/253,703, filed Jun. 3, 1994, now abandoned.

BACKGROUND OF THE INVENTION

The present invention generally relates to locking mechanisms, and more particularly to a locking mechanism for a check-in/check-out model.

Recently, information processing systems such as the client-server type work stations employ a system of carrying out a transaction process by making access to the resources of a common database. In this case, when the processing unit of the transaction is short as in the case of an on-line system of banks, the transaction process with respect to the database of a server is carried out at a high speed in response to a request from a client.

In computer aided design (CAD) and computer aided software environment (CASE), the length and the form of usage of the transactions are quite different from the transactions in the on-line system of banks, for example. However, it is desirable to use the database as a data storage in the field of engineering such as the CAD and CASE. Hence, in a file system which supports cooperative work such as a design work simultaneously handled by a plurality of design engineers, a database is introduced in addition to the check-in/check-out model which is the conventional form of use in general. The database introduced in such a file system can utilize the advantages of the processing functions or the like, including transaction service, high-level data model and data retrieval.

By introducing the check-in/check-out model into the database, problems peculiar to the transactions in the engineering field occur due to the nature of the transactions. For example, the editing operation may take a long time, and the operation may involve interactive operation. It is thus necessary to overcome these problems.

FIG. 1 shows an example of the construction of a conventional transaction model, and FIG. 2 shows an example of the construction of a conventional check-in/check-out model.

In FIG. 1, a client A, a client B and a server S respectively are provided on independent work stations. A public database DB which is shared by the clients A and B is provided with respect to the server S. For example, the public database DB stores the ledger data of the bank, and the server S is provided on the work station which manages the ledger data. In addition, the clients A and B respectively are provided on the work stations (or terminals) which makes the on-line connection to the server S. According to this construction, when the client A or B generates a request to make reference to or to renew the contents of the public database DB, the server S carries out the transaction process depending on the request. In this case, the data of the transaction that are processed are short, and the processing can be made at a high speed. In addition, the processes are carried out in the generated sequence.

Accordingly, when the client B makes a reference to the contents of the public database DB after the contents of the public database DB are renewed by the transaction process requested from the other client A, the client B will obtain the renewed contents. As a result, the data are generated in correspondence with the transactions which are generated with the lapse of time, and the data consistency is guaranteed.

When the transaction model shown in FIG. 1 is applied to the engineering work such as the CAD and CASE, the public database DB will be used exclusively by one client for a long time on the order of several hours to several days, for example, due to the nature of the engineering work, and the public database DB will be used in a conversational style. As a result, the performance of the transaction model deteriorates due to the exclusive use of the resources for a long time, and the work will be aborted for a long time if a deadlock occurs. Hence, the check-in/check-out model has been proposed to overcome these problems of the transaction model.

In the check-in/check-out model shown in FIG. 2, the public database DB is provided with respect to the server S, similarly as in the case of the transaction model shown in FIG. 1. But in FIG. 2, private databases PDB1 and PDB2 are respectively provided with respect to the clients A and B. The right to make access to the private database PDB1 is given to the user of the client A, and the right to make access to the private database PDB2 is given to the user of the client B. The right to make access to the public database DB is given to the users of all clients, that is, the users of the clients A and B in this case. Hence, the public database DB is shared by the clients A and B.

When the user of the client A uses the public database DB to make an editing or the like, the client A requests copying of the necessary data to the server S. The server S retrieves the necessary data from the public database DB in response to this request, and transfers the necessary data to the client. The client A copies the received necessary data to the private database PDB1. The above process is called "check-out". Thereafter, the client A can carry out processes such as editing with respect to the data in the conversational style for a long time using the private database PDB1 which stores the necessary data which are copied. Similarly, the client B can also copy the necessary data from the public database DB into the private database PDB2 via the server S by the check-out operation, and carry out processes with respect to the data for a long time using the private database PDB2.

On the other hand, when the client A ends the processes such as editing with respect to the contents of the private database PDB1, the data in the private database PDB1 are returned to the public database DB via the server S so as to renew the contents of the public database DB. This process of obtaining the data from the private database PDB1 of the client A and returning the data to the public database DB via the server is called "check-in".

In order to maintain data consistency of the database in the transaction model shown in FIG. 1, a 2-phase locking mechanism is employed. The data consistency (or serializability) is maintained when it is guaranteed that the contents of the database change in the sequence in which the transactions are generated. The data consistency cannot be maintained when a double renewal in which a process of a transaction with respect to a data D is generated while carrying out a process of renewing the data D to a data D' by another transaction with respect to the data D, or the renewal loss is generated when a failure occurs, but the data consistency can be maintained if it is guaranteed that the contents of the database change in the sequence in which the transactions are generated.

According to the conventional 2-phase locking mechanism, one phase locks the data and one phase unlocks the data within one transaction, so as to lock out the other transactions.

On the other hand, in the check-in/check-out model shown in FIG. 2, it takes a long time to carry out the process such as editing of the data after the check-out operation, and it is impractical to strictly maintain the data consistency as in the case of the transaction model shown in FIG. 1. For this reason, a system employed in the check-in/check-out model makes no transaction management. Instead of maintaining the data consistency based on the transactions, the system permits the phase of the check-out and the phase of the check-in not to be independent of each other, and also permits the data checked out by one user in a renew mode to be checked out by another user in a reference mode.

There are demands to realize a process which takes a short time and a process which takes a long time on the same system by assembling the check-in/check-out model such as that shown in FIG. 2 into the existing database of the transaction model such as that shown in FIG. 1. For example, in the CAD, when a conversational style design is being made with respect to the design data which are checked out from the database, the realization of the above would make it possible to refer to the database for the data related to the necessary parts.

However, when the check-in/check-out model is assembled into the existing database, the 2-phase locking mechanism of the existing database and the check-in/check-out model affect each other, thereby introducing the possibility of losing the data consistency of the existing database.

Next, a description will be given of a particular example of the loss of the data consistency when the transaction of the 2-phase locking mechanism and the check-in/check-out model are simply combined, by referring to FIG. 3.

In FIG. 3, LT denotes a transaction by the client A in the check-in/check-out model, and ST denotes a transaction by the client B using the 2-phase locking mechanism. According to the initial values stored in the database, an account X and an account Y both have a balance of 100 dollars. In this state, the transaction LT remits 20 dollars to the account Y from the account X, and the transaction ST calculates a sum of the balance of the account X and the balance of the account Y.

First, the transaction LT checks out the account X and carries out the process of subtracting 20 dollars (so that X becomes 80 dollars), and then checks out the account Y and carries out the process of adding 20 dollars (so that Y becomes 120 dollars). Thereafter, the account X and the account Y are checked in.

On the other hand, when the transaction ST carries out the process of referring to (or reading) the account X and the account Y and adding the balances, the reading of the account X following the first open transaction becomes possible after the transaction LT checks out the account X, and 100 dollars is read out as the balance of the account X.

Then, the reading of the account Y becomes possible after the transaction LT checks in the account Y, and in this case, 120 dollars is read as the balance of the account Y because 20 dollars is added to the balance of the account Y by the transaction LT described above. As a result, "X+Y=220 dollars" is obtained when a "PRINT X+Y" process is carried out. This result obtained is incorrect because the correct sum of the balances of the accounts X and Y should be 200 dollars.

Therefore, the system which generates error in the data causes a serious problem. It is conceivable to overcome this problem by suiting the check-in/check-out model to the locking mechanism of the existing database. However, when the design work is made by a plurality of design engineers using the check-in/check-out model, there frequently are cases where one design engineer wishes to refer to a portion of a plan modified by another design engineer. In addition, since the modifying work and the like take a long time in general, there is a problem in that it is from the practical point of view intolerable to wait a long time until the modifying work ends.

SUMMARY OF THE INVENTION

Accordingly, it is a general object of the present invention to provide a novel and useful locking mechanism in which the problems described above are eliminated.

Another and more specific object of the present invention is to provide a locking mechanism for a check-in/check-out model, which maintains data consistency based on transactions of an existing database, and avoids deterioration of the performance caused by exclusive use of the resources for a long time in the check-in/check-out model.

Still another object of the present invention is to provide a locking mechanism for a check-in/check-out model in which one or a plurality of clients make access to a public database of a server, comprising long transaction management means, provided in the server, for managing transactions including a check-out which copies data from the public database and a check-in which writes data back to the public database requested from the client, short transaction management means, provided in the server, for managing transactions which do not copy data from the public database, and a transaction list storing information indicative of contents of transactions carried out by each of the long transaction management means and the short transaction management means, where the long transaction management means includes means for waiting the check-in of arbitrary data until another transaction making reference to the arbitrary data ends when the other transaction is detected from the transaction list between the check-out and the check-in. According to the locking mechanism of the present invention, it is possible to maintain the data consistency of the conventional transaction model, and the check-in/check-out model can be assembled in the conventional database system. In addition, by employing the inventive locking mechanism into the locking mechanism of the check-in/check-out model, it becomes unnecessary for the user to maintain the data consistency during operation. In other words, it is possible to integrate the conventional transaction model and the check-in/check-out model while bringing out the advantageous features of the two without contradictions.

A further object of the present invention is to provide a server having a locking mechanism for a check-in/check-out model in which one or a plurality of clients make access to a public database coupled to the server, comprising long transaction management means for managing transactions including a check-out which copies data from the public database and a check-in which writes data back to the public database requested from the client, short transaction management means for managing transactions which do not copy data from the public database, and a transaction list storing information indicative of contents of transactions carried out by each of the long transaction management means and the short transaction management means, where the long transaction management means includes means for waiting the check-in of arbitrary data until another transaction making reference to the arbitrary data ends when the other transaction is detected from the transaction list between the check-out and the check-in. According to the server of the present invention, it is possible to maintain the data consistency of the conventional transaction model, and the check-in/check-out model can be assembled in the conventional database system. In addition, by employing the inventive locking mechanism into the locking mechanism of the check-in/check-out model, it becomes unnecessary for the user to maintain the data consistency during operation. In other words, it is possible to integrate the conventional transaction model and the check-in/check-out model while bringing out the advantageous features of the two without contradictions.

Other objects and further features of the present invention will be apparent from the following detailed description when read in conjunction with the accompanying drawings.

BRIEF DESCRIPTION OF THE DRAWINGS

FIG. 6 is a flow chart for explaining the process of the embodiment of the locking mechanism;

DESCRIPTION OF THE PREFERRED EMBODIMENTS

First, a description will be given of the operating principle of the present invention, by referring to FIG. 4.

Figure 4:
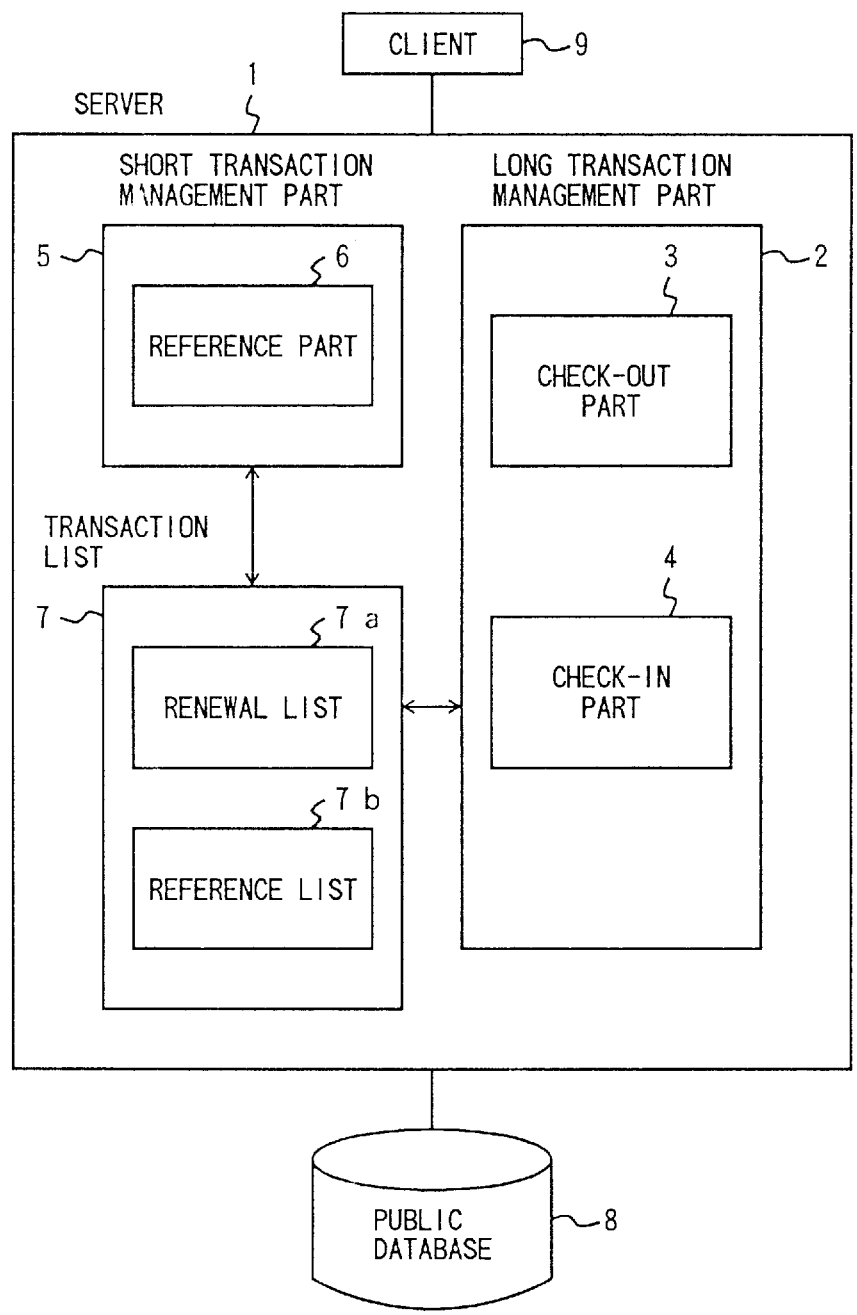
FIG. 4 is a system block diagram for explaining the operating principle of the present invention.

FIG. 4 shows a server 1 which couples a public database 8 and a client 9. The server 1 includes a long transaction management part 2 for managing long transactions, a short transaction management part 5 for managing short transactions, and a transaction list 7. The long transaction management part 2 includes a check-out part 3 and a check-in part 4. The short transaction management part 5 includes a reference part 6. The transaction list 7 includes a renewal list 7a and a reference list 7b.

In the present invention, measures are taken so as to distinguish the transactions of the present invention from the conventional transactions. More particularly, an interval between the check-in and the check-out is regarded as a long transaction, and the transaction is made up of two phases. A first phase of the transaction solely consists of the data check-out, and a second phase of the transaction solely consists of data check-in. The server 1 judges the phase for each long transaction. When the data is checked in after the check-out, the server 1 controls the check-in time depending on whether or not other transactions are making access to the same data, so as to maintain the data consistency.

When the client 9 requests the check-out of data in the renewal mode, the long transaction management part 2 of the server 1 judges that this check-out is divided into two phases. In addition, if the request is valid, the long transaction management part 2 opens the long transaction and starts the check-out part 3. The check-out part 3 checks out the requested data. In other words, the check-out part 3 retrieves the requested data from the public database 8 and copies the retrieved requested data to the client 9. In this state, a transaction identification (ID, or ID number) of the long transaction, a data ID, and a transaction status are registered in the renewal list 7a within the transaction list 7. The transaction status indicates the status of the transaction including "during or in process", "end" and the like.

The short transaction management part 5 manages the data according to the conventional 2-phase locking mechanism, that is, the locking is managed on the side of the public database 8. When a short transaction is generated from a client other than the client 9 so as to make a reference to the data, the short transaction management part 5 judges whether or not the data is the checked out data registered in the renewal list 7a. If the data is the same as the checked out data registered in the renewal list 7a, the transaction ID, the data ID and the transaction status are registered in the reference list 7b of the transaction list 7. When this short transaction ends, the registered information is deleted from the reference list 7b.

The reference to the data may be made when the client requests the check-out in the reference mode and also when the long transaction management part 2 opens the transaction so that the transaction is carried out by the check-out part 3. In both of these cases, the judgement of the renewal list 7a and the registration to the reference list 7b are carried out similarly to the above.

When the client 9 ends the data processing and request the data check-in, the check-in part 4 of the long transaction management part 2 within the server 1 judges whether or not the check-in is divided into two phases in correspondence with the check-out. If the request is valid, the long transaction management part 2 judges whether or not other opened transactions which refer to the same data exist by checking the reference list 7b. If there is another opened transaction exists, a wait state occurs until this other opened transaction ends (closes). On the other hand, if no other opened transaction exists, the check-in is made to renew the public database 8. During the wait of this check-in, the other transactions are temporarily prohibited from making reference to the checked out data.

Accordingly, when the check-out of the check-in/check-out model and the reference of the transaction are generated simultaneously with respect to the same data, the reference made by the transaction between the check-out and the check-in is forcibly scheduled before the check-out, so as to maintain the data consistency among the transactions.

Figure 5:
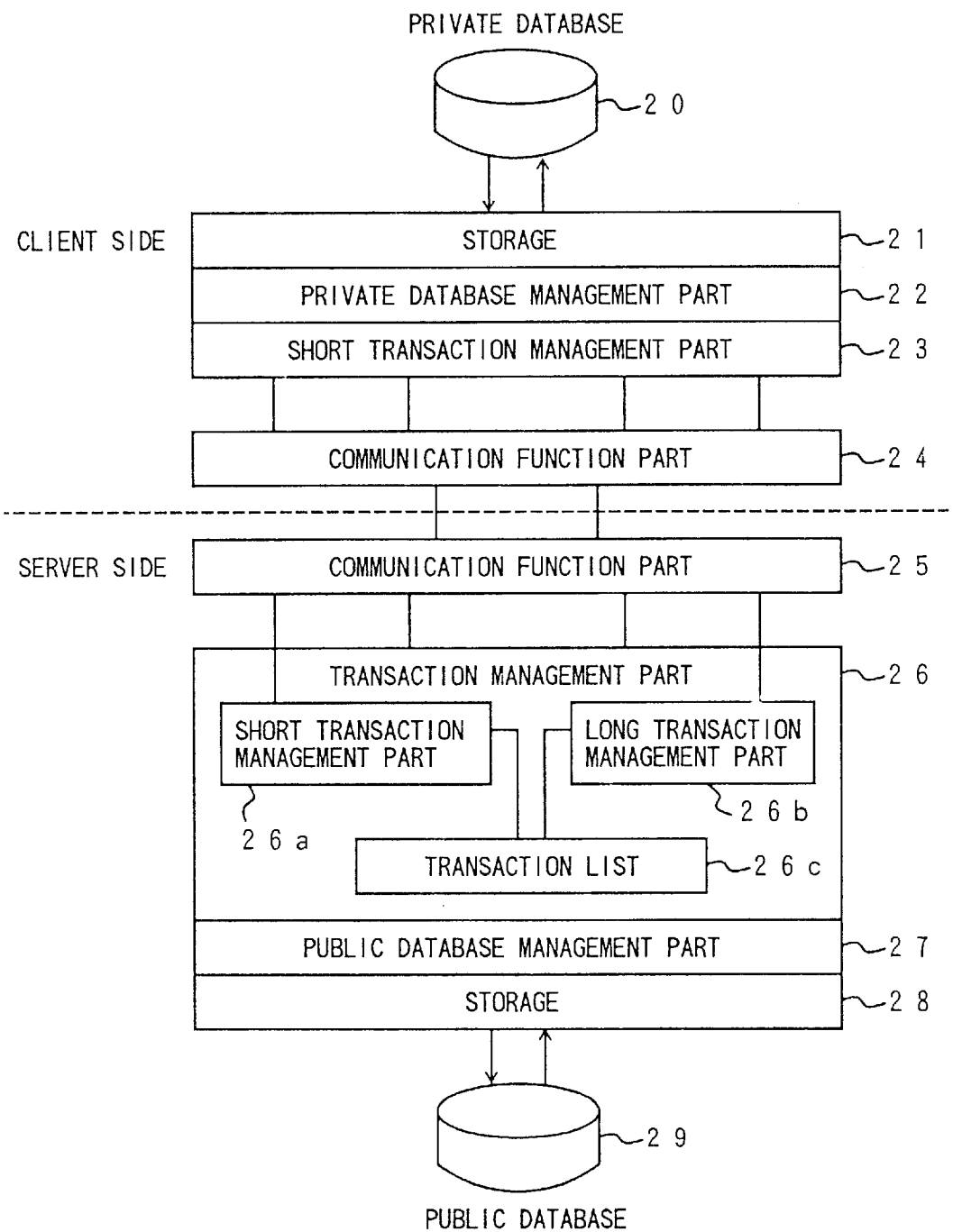
FIG. 5 is a system block diagram showing an embodiment of a locking mechanism according to the present invention.

Next, a description will be given of an embodiment of a locking mechanism for check-in/check-out model according to the present invention. FIG. 5 shows the construction of this embodiment of the locking mechanism, and FIG. 6 is a flow chart for explaining the process of this embodiment.

In FIG. 5, the client side is shown above the dotted line, and the server side is shown below the dotted line. Actually, a plurality of clients are connected with respect to the server, however, only one client is shown in FIG. 5 for the sake of convenience.

The client side includes a private database 20 for exclusive use by the user, a storage 21 for buffering data input to and output from the private database 20, a private database management part 22, a short transaction management part 23, and a communication function part 24 for making a communication control between the client side and the server side.

The server side includes a communication function part 25 for making a communication control between the server side and the client side, a transaction management part 26 for managing various kinds of transactions requested from the client side, a public database management part 27, a storage 28 for buffering data, and a public database 29. The transaction management part 26 includes a short transaction management part 26a for managing transactions such as reference and renewal which do not involve copying of the data, a long transaction management part 26b for managing check-in/check-out type transactions which involve copying of the data, and a transaction list 26c which includes a renewal mode list and a reference mode list.

In the case of a long transaction, after the data is checked out from the public database 29 from the server side and copied into the private database 20 on the client side, the client side makes exclusive use of the data. Hence, there is no need to manage the long transaction on the client side. However, in the case of a multi-process, a plurality of short transactions are generated by the same user, and processes such as referring to the public database 29 on the server side are carried out. For this reason, the short transaction management part 23 is provided on the client side.

The server side makes communications with a plurality of clients via the communication function part 25, and the transaction management part 26 identifies the requested transaction. The short transaction such as the reference which makes no check-in/check-out is processed by the short transaction management part 26a. On the other hand, the long transaction such as the renewal mode and the reference mode of the check-in/check-out model is processed in the long transaction management part 26b.

A registration or a reference is made to the transaction list 26c during the processes of each of the short transaction management part 26a and the long transaction management part 26b. The transaction ID, the data ID and the transaction status information are stored in the renewal list and the reference list of the transaction list 26c. The transaction status information indicates whether the transaction is being processed or the processing of the transaction has ended. For the state where the processing of the transaction has ended, a commit flag is provided to indicate a commit state where the transaction is carried out and the transaction is reflected to the data or, an abort state where the transaction is not carried out and corresponds to the state before the transaction is started.

The public database management part 27 makes access to the public database 29 in response to an instruction from the transaction management part 26, and manages the read and write of the requested data from and to the public database 29 via the storage 28.

FIG. 6 is a flow chart for explaining the process of the embodiment shown in FIG. 5.

In FIG. 6, a step S1 first checks out the data necessary on the client side, and copies the necessary data from the public database 29 to the private database 20. In the case of the check-out in the renewal mode, a renewal lock is made with respect to the data within the public database 29. On the other hand, in the case of the check-out in the reference mode, a reference lock is made. Hence, this step S1 involves the communication function parts 24 and 25 and the long transaction management part 26b.

Then, a step S2 registers the identifier (ID) of the client, the ID number of the checked out data and the commit flag which indicates the transaction state into the transaction list 26c within the transaction management part 26 on the server side. Hence, this step S2 involves the long transaction management part 26b and the transaction list 26c.

Thereafter, even when a reference to the data checked out by another client occurs, and even when the renewal lock is already made with respect to the data, it is possible in a step S3 to refer to the data in the public database 29 which holds the state before the renewal. In addition, in order to maintain the data consistency when this reference is made, this reference is registered in the transaction list 26c on the server side. Hence, this step S3 involves the short transaction management part 26a and the transaction list 26c.

A step S4 sets a flag which indicates the end state in the commit flag of the transaction list 26c when the commit state or the abort state of the transaction registered in the transaction list 26c occurs. As described above, the commit state indicates the state where the transaction is ended and the transaction is reflected to the data, and the abort state indicates the state where the transaction failed and corresponds to the state before the transaction is made. Hence, this step S4 involves the short transaction management part 26a and the transaction list 26c.

When the editing operation on the private database 20 ends with respect to the data checked out on the client side, a step S5 requests check-in of the data to the server side from the client side. Hence, this step S5 involves the communication function parts 24 and 25.

In this case, a step S6 checks the transaction list 26c related to the data having the same data ID (that is, the same data as) the data to be checked in. Hence, this step S6 involves the long transaction management part 26b.

A step S7 decides whether or not a transaction related to the same data and having a commit flag which is not in the end state exists. Hence, this step S7 involves the transaction management part 26.

If there exists a transaction which is not in the end state and the decision result in the step S7 is YES, a step S8 prohibits a reference to the checked out data, and enters the wait state to wait for the end of the check-in. This wait state is released when the transaction assumes the end state. In other words, the process returns to the step S7 after the step S8. Hence, this step S8 involves the transaction management part 26.

On the other hand, if the decision result in the step S7 is NO, a step S9 carries out the check-in request on the server side, and the process ends after checking in the requested data into the public database 29. Hence, this step S9 involves the transaction management part 26.

In the wait state of the check-in, the data reference by other transactions may occur consecutively, and there is a possibility that the check-in cannot be carried out. Hence, the process of the step S8 is carried out to cope with such a situation. In other words, in the wait state of the check-in, the reference to the data obtained by the check-out which is the precondition of the check-in by the other transactions is prohibited. In this case, when the long time required by the check-out and the check-in is compared with the relatively short time required by the transaction such as the conventional reference, the wait time of the short transaction caused by the prohibition described above is negligible. The long transaction which exclusively uses the data checked out in the renewal mode may wait until the long transaction which checks out the same data in the reference mode to close (end), and it is possible that the performance will become deteriorated, however, it is possible to reduce the wait time by utilizing the notifying function. In addition, since the short transaction is managed by the basic 2-phase locking mechanism, the short transaction will not wait for the long transaction.

Figure 7:
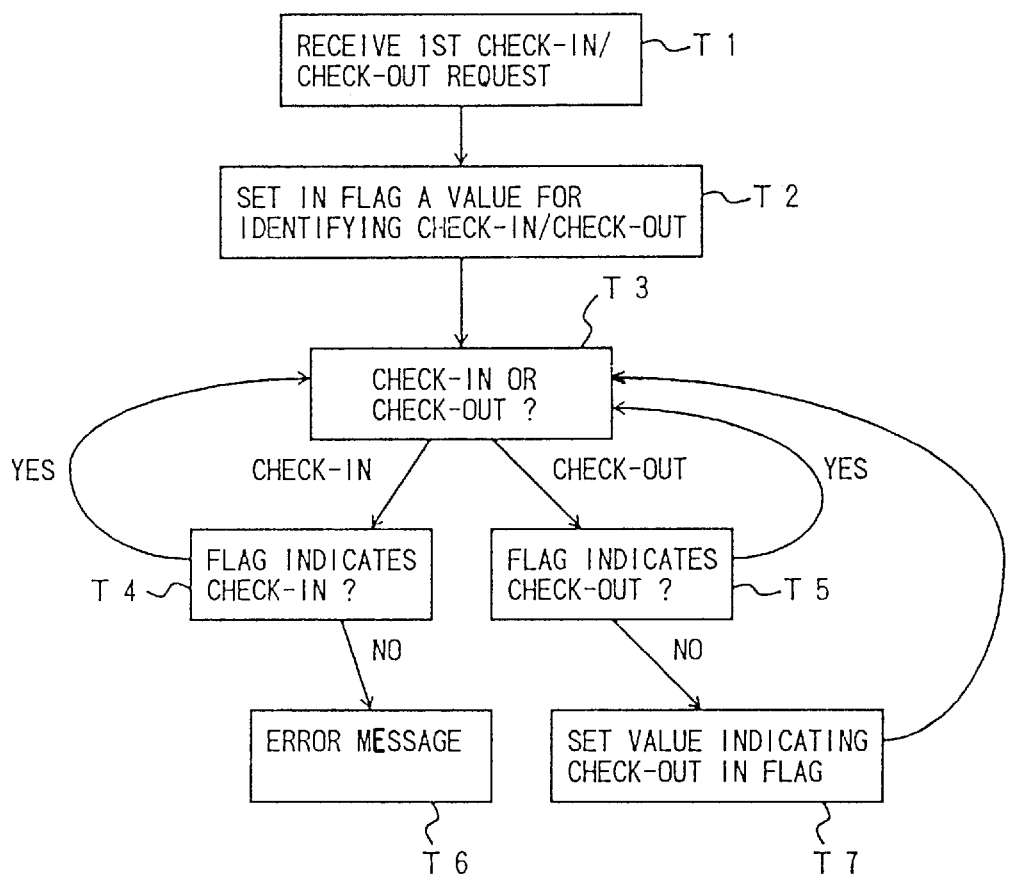
FIG. 7 is a flow chart for explaining the process of a transaction management part shown in FIG. 5.

Although not shown in FIG. 6, one long transaction may not be divided into the two phases, that is, the check-in phase and the check-out phase. FIG. 7 is a flow chart for explaining the process of the transaction management part 26 and particularly the process of the long transaction management part 26b in such a case.

In FIG. 7, a step T1 receives the first check-in or check-out request, and a step T2 sets in a flag a value for identifying the check-in and check-out. A step T3 decides whether the check-in request or the check-out request from the user is detected. If the check-in request is detected in the step T3, a step T4 decides whether or not the flag indicates the check-in, and a step T6 outputs an error message and the request is not carried out if the decision result in the step T4 is NO. On the other hand, the process returns to the step T3 if the decision result in the step T4 is YES. If the check-out request is detected in the step T3, a step T5 decides whether or not the flag indicates the check-out, and a step T7 sets in the flag a value which indicates the check-out if the decision result in the step T5 is NO. The process returns to the step T3 if the decision result in the step T5 is YES or after the step T7.

Figure 1:
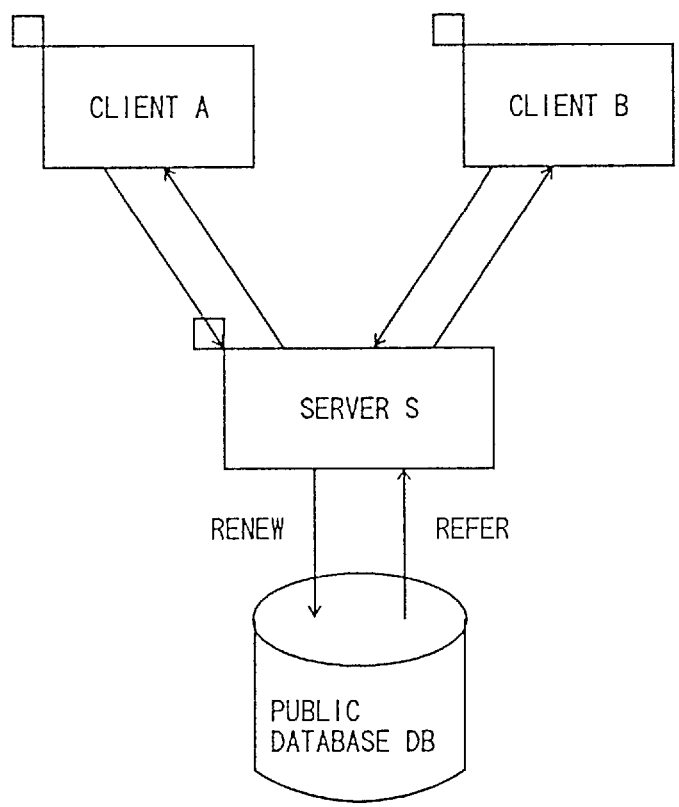
FIG. 1 is a system block diagram showing an example of the construction of a conventional transaction model.
Figure 2:
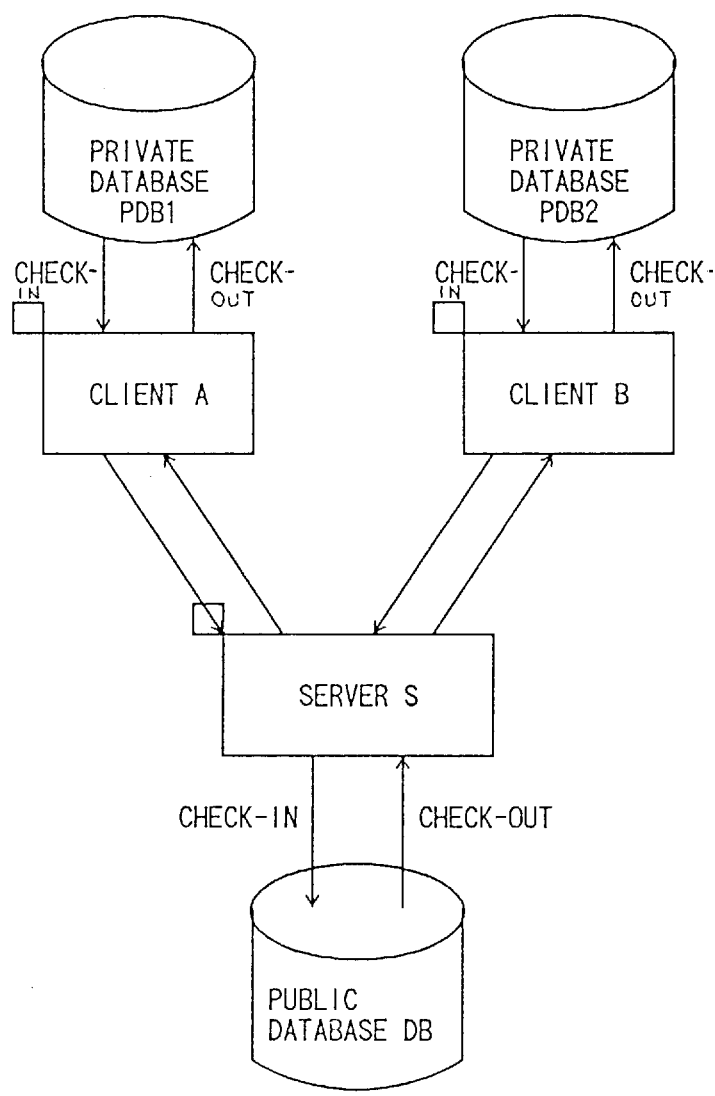
FIG. 2 is a system block diagram showing an example of the construction of a conventional check-in/check-out model.
Figure 3:
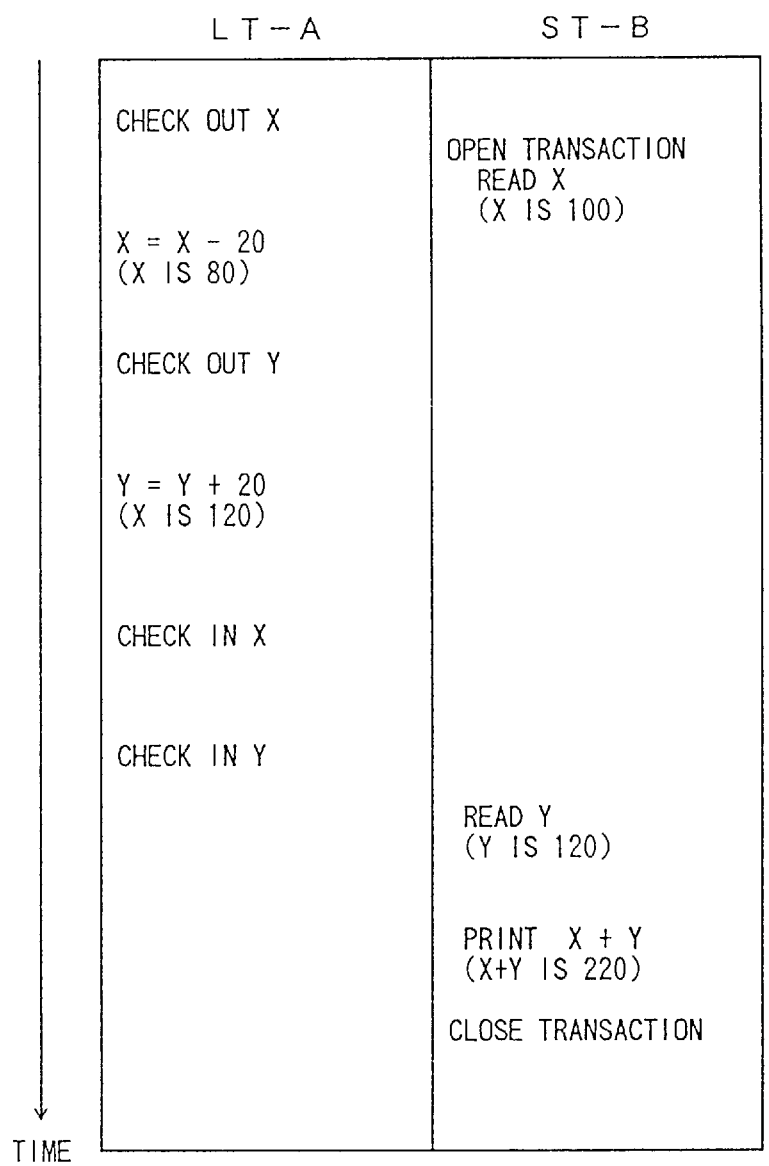
FIG. 3 is a diagram for explaining a particular example of the loss of data consistency when a transaction of a 2-phase locking mechanism and the check-in/check-out model are simply combined.
Figure 8:
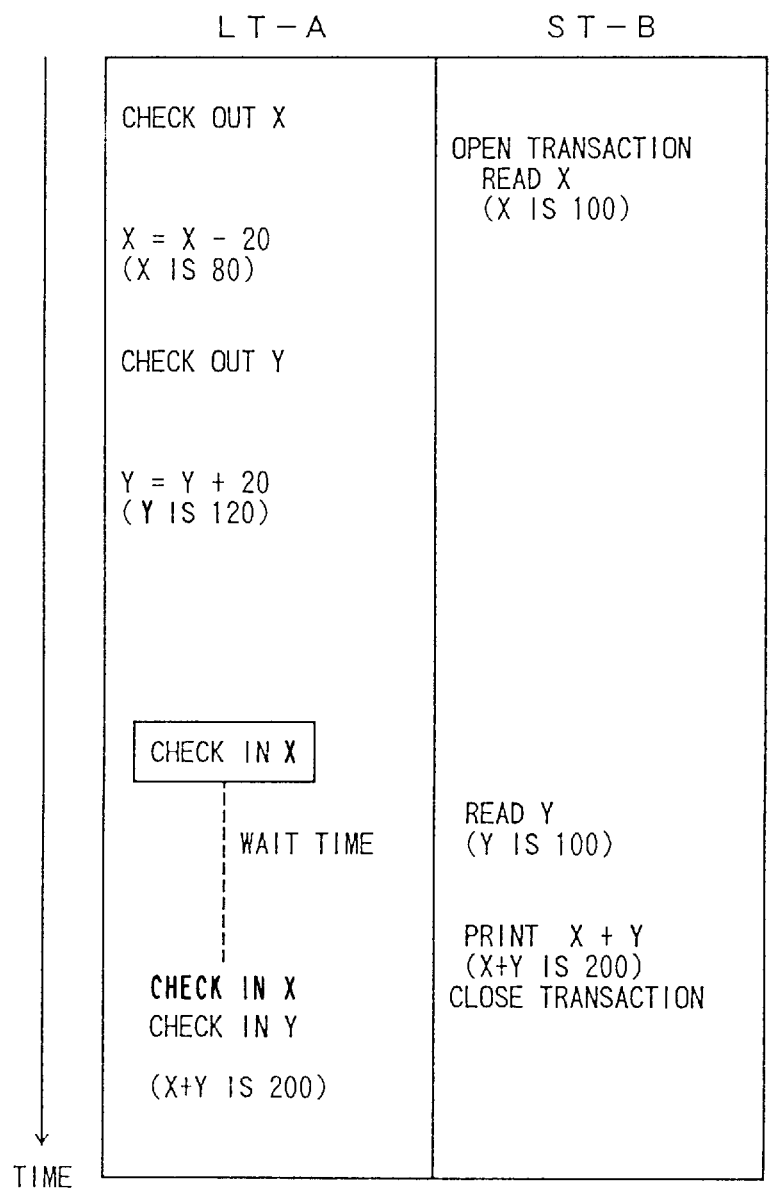
FIG. 8 is a diagram for explaining the data consistency obtainable in the present invention.

FIG. 8 is a diagram for explaining the data consistency obtainable in the present invention. The particular example shown in FIG. 8 corresponds to the conventional case shown in FIG. 3 where the data consistency is lost, so that the effects of the present invention can more easily be appreciated.

In FIG. 8, LT denotes a long transaction of the check-in/check-out by the client A, and ST denotes a short transaction of the reference made by the client B. The initial values of the accounts X and Y stored in the public database 29 on the server side are both 100 dollars. In this state, the long transaction LT remits 20 dollars to the account Y from the account X, and the short transaction ST calculates a sum of the balances of the accounts X and Y.

First, the long transaction LT checks out the account X, subtracts 20 dollars from the account X, checks out the account Y, adds 20 dollars to the account Y, and checks in the account X. On the other hand, the short transaction ST opens the transaction and makes a reference to (that is, reads) the account X. Hence, up to this point, the processes are the same as those of the conventional case shown in FIG. 3.

However, when checking in the account Y in FIG. 8, it is judged from the transaction list 26c that the other transaction (ST) which processes the same data (account X) as the transaction (LT) has not ended, and waits for the check-in of the account Y. Thereafter, when the short transaction ST reads the balance of the account Y, prints the sum of the balances of the accounts X and Y and the transaction closes, the check-in of the account Y is made by the long transaction LT. As a result, the result of "X+Y" in the long transaction LT becomes "200 dollars" which is different from the conventional case shown in FIG. 3. Hence, in the case of the present invention shown in FIG. 8, it is possible to maintain the data consistency, unlike the conventional case shown in FIG. 3.

In other words, FIG. 8 shows a particular example in which the check-in is temporarily waited until the related transaction closes, so that the check-in/check-out model and the transactions are integrated while maintaining consistency.

Further, the present invention is not limited to these embodiments, but various variations and modifications may be made without departing from the scope of the present invention.

What is claimed is:

1. A locking mechanism for a check-in/check-out model in which at least one and a plurality of clients make access to a public database of a server, said locking mechanism comprising:

long transaction management means, provided in the server, for managing copy transactions including a check-out which copies data from the public database and a check-in which writes data back to the public database requested from the at least one and a plurality of clients;

short transaction management means, provided in the server, for managing reference transactions which do not copy data from the public database; and a transaction list storing information indicative of whether transactions carried out by each of said long transaction management means and said short transaction management means include reference and copy transactions, said long transaction management means including means for waiting the check-in of data until another transaction making reference to the data of the copy ends when said another transaction is detected from said transaction list between the check-out and the check-in.

2. The locking mechanism as claimed in claim 1, wherein said long transaction management means includes means for prohibiting other transactions making reference to the data from being carried out when a waited transaction making reference to the data and generated between the check-out and check-in waits for the check-in of the data until the waited transaction ends.

3. A locking mechanism for a check-in/check-out model in which at least one and a plurality of clients make access to a public database of a server, said locking mechanism comprising:

long transaction management means, provided in the server, for managing transactions including a check-out which copies data from the public database and a check-in which writes data back to the public database requested from the at least one and a plurality of clients;

short transaction management means, provided in the server, for managing transactions which do not copy data from the public database;

a transaction list storing information indicative of contents of transactions carried out by each of said long transaction management means and said short transaction management means; and said long transaction management means including means for waiting the check-in of data until another transaction making reference to the data ends when said another transaction is detected from said transaction list between the check-out and the check-in;

wherein said transaction list includes at least an identification number of each transaction, an identification number of each data and status information related to each transaction in correspondence with a renewal mode and a reference mode of each transaction; and said long transaction management means and said short transaction management means make reference to said transaction list depending on a transaction which is carried out, register information related to the transaction in a portion of said transaction list corresponding to the mode when carrying out the transaction, and delete registered information related to the transaction from said transaction list when the transaction ends.

4. The locking mechanism as claimed in claim 1, wherein said transaction list is provided in the server.

5. A server having a locking mechanism for a check-in/check-out model in which at least one and a plurality of clients make access to a public database coupled to said server, said server comprising:

long transaction management means for managing transactions including a check-out which copies data from the public database and a check-in which writes data back to the public database requested from the at least one and a plurality of clients;

short transaction management means for managing reference transactions which do not copy data from the public database; and a transaction list storing information indicative of whether transactions carried out by each of said long transaction management means and said short transaction management means include reference and copy transactions, said long transaction management means including means for waiting the check-in of data until another transaction making reference to the data of the copy ends when said another transaction is detected from said transaction list between the check-out and the check-in.

6. The server as claimed in claim 5, wherein said long transaction management means includes means for prohibiting other transactions making reference to the data from being carried out when a transaction making a reference to the data and generated between the check-out and the check-in waits for the check-in of the data until the waited transaction ends.

7. A locking mechanism for a check-in/check-out model in which at least one and a plurality of clients make access to a public database of a server, said locking mechanism comprising:

long transaction management means, provided in the server, for managing transactions including a check-out which copies data from the public database and a check-in which writes data back to the public database requested from the at least one and a plurality of clients;

short transaction management means, provided in the server, for managing transactions which do not copy data from the public database;

a transaction list storing information indicative of contents of transactions carried out by each of said long transaction management means and said short transaction management means; and said long transaction management means including means for waiting the check-in of data until another transaction making reference to the data ends when said another transaction is detected from said transaction list between the check-out and the check-in;

wherein said server comprising:

long transaction management means for managing transactions including a check-out which copies data from the public database and a check-in which writes data back to the public database requested from the at least one and a plurality of clients;

short transaction management means for managing transactions which do not copy data from the public database;

a transaction list storing information indicative of contents of transactions carried out by each of said long transaction management means and said short transaction management means; and said long transaction management means including means for waiting the check-in of data until another transaction making reference to the data ends when said another transaction is detected from said transaction list between the check-out and the check-in;

said transaction list includes at least an identification number of each transaction, and identification number of each data and status information related to each transaction in correspondence with a renewal mode and a reference mode of each transaction; and said long transaction management means and said short transaction management means make a reference to said transaction list depending on a transaction which is carried out, register information related to the transaction in a portion of said transaction list corresponding to the mode when carrying out the transaction, and delete registered information related to the transaction from said transaction list when the transaction ends.

8. A locking mechanism for a server containing a public database, comprising:

means for performing a database read operation and database write operation of a data;

a transaction list storing information indicative of the read and write operations; and means for scheduling said read operation and said write operation of said data with said write operation being scheduled after said read operation ends using said transaction list.

9. A locking mechanism of a server connected with a public database, comprising:

long transaction management means in the server for managing a check-out transaction copying data from the public database followed by a check-in transaction writing data into the public database a transaction list storing information indicative of the check-out and check-in transactions; and waiting means for checking said transaction list and, when an intervening transaction is detected between said check-out transaction and said check-in transaction, said check-in transaction being delayed by said waiting means until said intervening transaction terminates.

10. A locking mechanism for a check-in/out model where check-out is a read from a database, and check-in is a write into the database, said locking mechanism comprising:

a transaction management mechanism including a transaction list accepting a single check-in transaction and plurality of check-out transactions for data at a same time, in a way in which the check-out transactions do not overlap or span an updating time period for the data processed responsive to the check-in transaction and all of the check-out transactions are completed before the check-in transaction is allowed to perform the write into the database using the transaction list.

11. A database locking method including copy requests, read requests, write requests and transactions, comprising:

preventing, using a transaction list, an open first transaction that has performed a copy request on data from performing a write request on the data until all second transactions that open subsequent to the first transaction and, which are stored on the transaction list, and which includes read only requests on the data, have closed.

12. A database method, comprising:

opening a first transaction that includes a copy and a write request and storing the first transaction on a transaction list;

opening a second transaction that includes only read requests and storing the second transaction on the transaction list;

allowing the first and second transactions to obtain data from the database;

allowing the first transaction to modify the copied data producing modified data;

preventing the first transaction from writing the modified data into the database if the second transaction is on the transaction list as open; and allowing the first transaction to write the modified data into the database if the second transaction is off the transaction list as closed.

13. A database method, comprising:

performing mutually exclusive check-in transactions;

making a check-out transaction mutually exclusive with a write of a check-in transaction upon arrival of the write that accesses the same data as the check-out and only during a pendency of the write using a transaction list; and making the write of the arrived check-in transaction wait until the mutually exclusive check-out transaction ends by providing the write with a lower priority than the check-out transaction on the transaction list.

* * * * *